May 16, 1933.    T. S. THOMPSON    1,909,238
DUMP BODY FOR TRUCKS
Filed Sept. 7, 1932    2 Sheets-Sheet 1
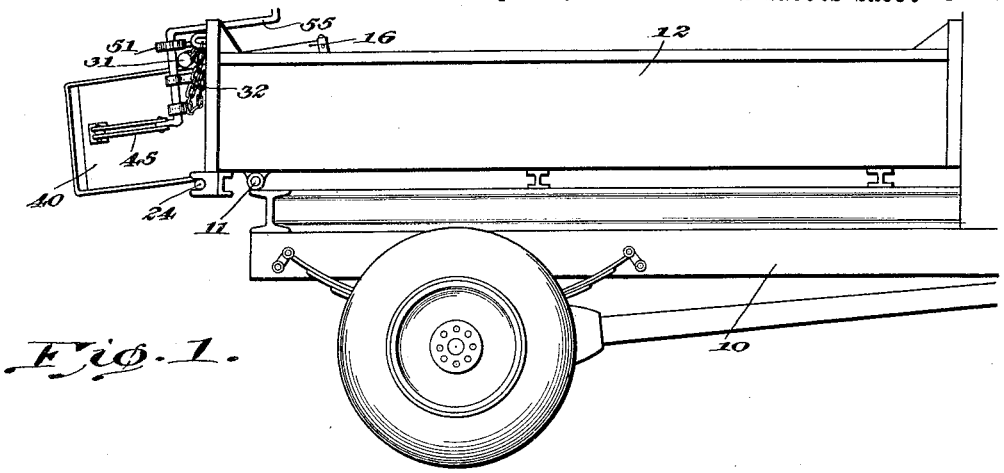
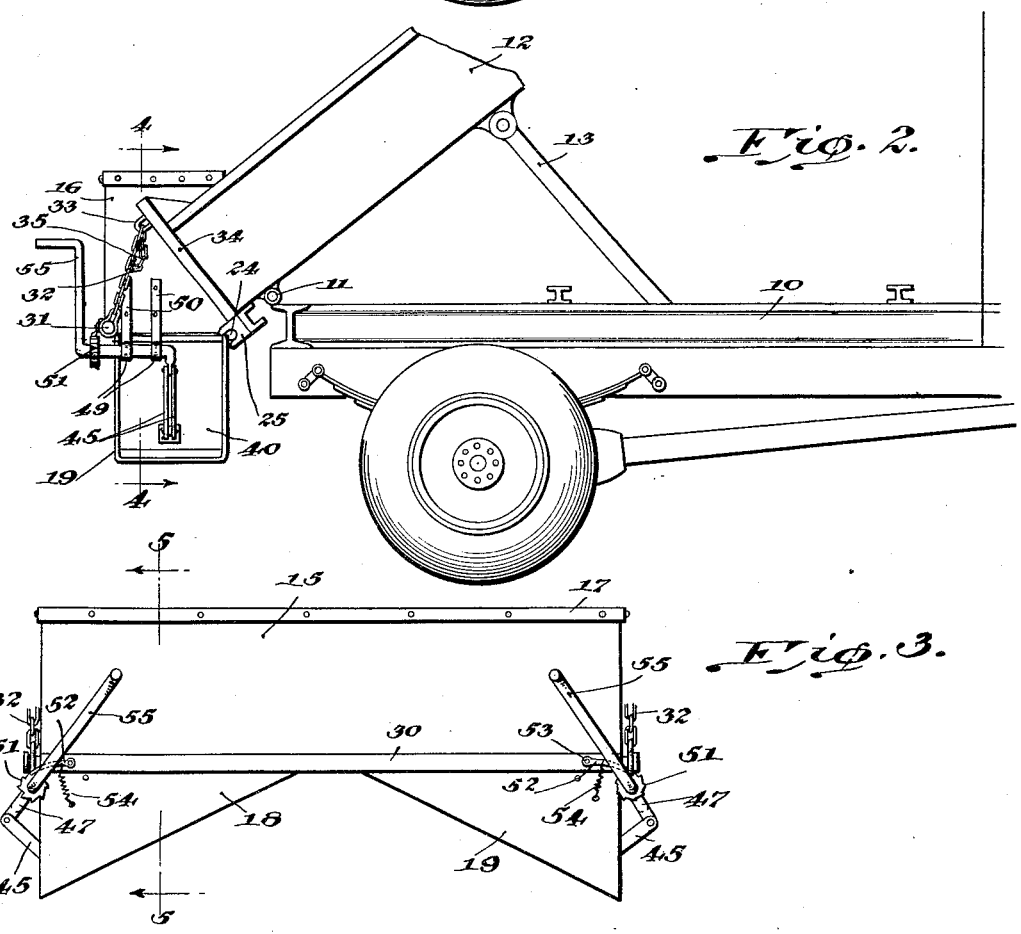
WITNESS
INVENTOR
T. S. Thompson,
BY
ATTORNEY

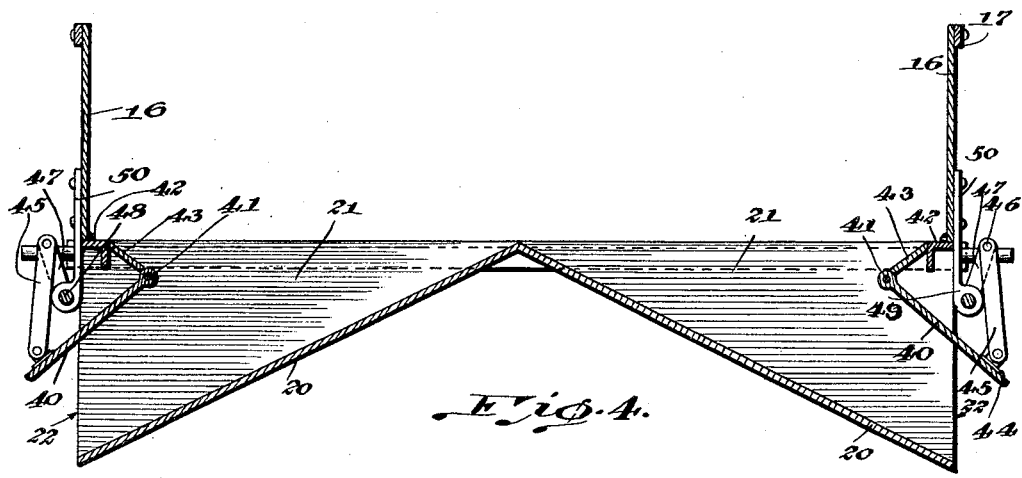
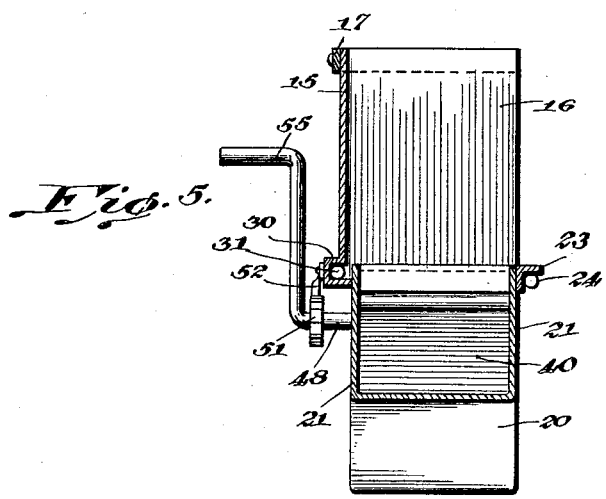

Patented May 16, 1933

1,909,238

UNITED STATES PATENT OFFICE

THOMAS S. THOMPSON, OF BELFAST, MAINE

DUMP BODY FOR TRUCKS

Application filed September 7, 1932. Serial No. 632,008.

This invention relates to dump bodies for trucks.

An object of the invention is the provision of a dumping body for a truck, the body having a rear open end carrying a pivotally mounted tailboard for normally closing the open end and provided with means for discharging materials from the body laterally of the body so that piles or rows of materials may be deposited along the shoulders of the roadbed where repairs are required.

A further object of the invention is the provision of a pivotally mounted tail gate at the rear open end of a truck body adapted for normally closing the rear end but which includes means for depositing materials laterally from the rear end of the truck, the tailboard including oppositely disposed chutes with manually releasable closures at the outer ends of the chutes.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

In the drawings:

Figure 1 is a fragmentary side elevation of a truck and body showing my improved tailboard applied thereto, Figure 2 is a side elevation of a truck and body similar to Figure 1 with the tailboard and body in dumping position, Figure 3 is a rear view in elevation of a tailboard constructed in accordance with the principles of my invention, Figure 4 is a longitudinal vertical section of the tailboard taken along the line 4—4 of Figure 3, and Figure 5 is a transverse vertical section of the tailboard taken along the line 5—5 of Figure 3.

Referring more particularly to the drawings, 10 designates a frame of a chassis of a truck upon which is pivotally mounted, at 11, a truck body 12. This truck body is adapted to be moved to an angular position with respect to the horizontal by means of a link 13 which is operated by mechanism, not shown, but which is well known in the art. The rear end of the body is open and is closed by a particular construction of tailboard which will be hereinafter described.

The tailboard is in the form of a casing which is pivotally mounted on the rear end of the body 12. This casing includes a back portion 15 and end walls 16. The end walls and back or rear wall 15 are reinforced at their upper ends by means of a strap 17.

A pair of chutes 18 and 19 extend in opposite directions from the central portion of the tailboard and have their bottom portions, as shown at 20, inclined downwardly in opposite directions towards the side edges of the truck body. Side walls 21 are connected to the inclined bottom 20 to form a chute which is open, as shown at 22, for the discharge of materials from the truck body.

To the side walls 21 of the chutes is connected an angle iron 23 and these side walls are secured to the end walls 16 of the tailboard.

A rod 24 is connected in any approved manner to the inner portion of the angle iron 23 and has its ends mounted in bearings 25 carried by the rear portion of the truck body 12. The rod 24 and the bearings 25 provide for the pivotal mounting of the tailboard so that the tailboard may be swung to an operative discharging position, as shown in Fig. 2, or may be placed in the position shown in Fig. 1 for closing the rear end of the truck when the body of the truck has been filled with materials for transportation from the source of materials to the roadbed.

The lower edge of the rear wall 15 of the tailboard is provided with a channel member 30 in which is mounted a rod 31 having its ends projecting beyond the end walls 16 of the tailboard. A chain 32 is connected to the projecting end of the rod 31, as shown in Fig. 2, adjacent each end wall 16 and this chain is extended upwardly and passed through a staple 33 carried by a post 34 mounted at the rear end of the body 12. The free end of the chain, as shown at 35, is connected in any approved manner at the main body of the chain for retaining the tailboard in a vertical position, as shown in Fig. 2. When the tailboard is placed in position, as shown in Fig. 1, for retaining the materials in the body 12, the chains are drawn through the staples 33 until the tailboard has been placed in a horizontal position and the chains will retain the tailboard in this position during transportation of materials.

A closure 40 for each open end of the chutes 18 and 19 is provided and is hinged at 41. An angle iron 42 is secured across the upper open end of each chute and an inclined plate 43 extends from this angle iron inwardly to the hinged portion of the closure 40. An ear 44 is secured to the outer face adjacent the lower end of the closure 40 and a pair of links 45 is connected to the ear 44. The upper ends of the links 45 are connected, as shown at 46, to a lever 47, which is secured to a shaft 48. This shaft is mounted in bearings 49 formed at the lower ends of straps 50. The shaft 48 extends outwardly from the side wall of either chute and is provided with a ratchet wheel 51 which is engaged by a pawl 52 pivotally mounted at 53 on a channel member 30. A spring 54 maintains the pawl in engagement with the ratchet wheel 51. A crank 55 is formed on the end of the rock shaft 48 so that the shaft may be manually actuated for closing or opening the members 40.

The operation of my device is as follows: The truck is loaded with the materials which are adapted to be deposited on the roadbed adjacent the shoulders either in piles or in rows and by the present construction this may be done in a much shorter time than formerly by existing constructions due to the fact that it is only necessary to set the crank 55 and maintain either closure 40 in a predetermined position through the ratchet 52 and the wheel 51 so that the driver may proceed along the roadbed for depositing the materials in a predetermined manner along the shoulders of the roadbed. The amount of materials deposited, of course, depends upon the amount of materials required to either repair the shoulders or to form new shoulders.

As the crank 55 is operated to open the closure 40, the lever 47 will be moved, thereby carrying the links 45 upwardly and likewise the lower free end of the closure.

Where the materials are to be deposited in piles, the closures are opened periodically to discharge the proper quantity from the body.

Before the materials are discharged, however, it is necessary to place the tailboard in the position shown in Figure 2 and this is done by the chains 32 which determine the proper position of the tailboard.

In order to maintain the proper discharge of materials the truck body 12 may be elevated at the proper angle, as shown in Fig. 2, in a well known manner.

After the materials have been discharged from the truck body the tailboard is placed in the horizontal position as shown in Fig. 1 and the truck is returned to the source of materials and refilled for further distribution of the materials along the roadbed.

I claim:

A dump body for trucks comprising a body having the rear end open, a tail board spaced outwardly from the rear end of the body, end walls connected to the opposite ends of the board and projecting inwardly of said board, the inner edges of the end walls co-operating with the side walls of the body for preventing loss of materials at these points from the body, chute closing the space between the lower edges of the board and end walls and providing means for discharging materials laterally from the body, said chutes extending in opposite directions from points intermediate of the end walls, a hinged closure for the outer end of each chute, means for hingedly mounting the inner ends of the end walls on the rear end of the body, a crank extending transversely of each chute and projecting beyond the ends of the vehicle, and means connecting the crank with the hinged closure for moving the closure to open position.

THOMAS S. THOMPSON.